Feb. 23, 1943.  W. H. BAERWALD  2,312,300
STOP LIGHT FOR VEHICLES AND TRAILERS
Filed Sept. 20, 1940
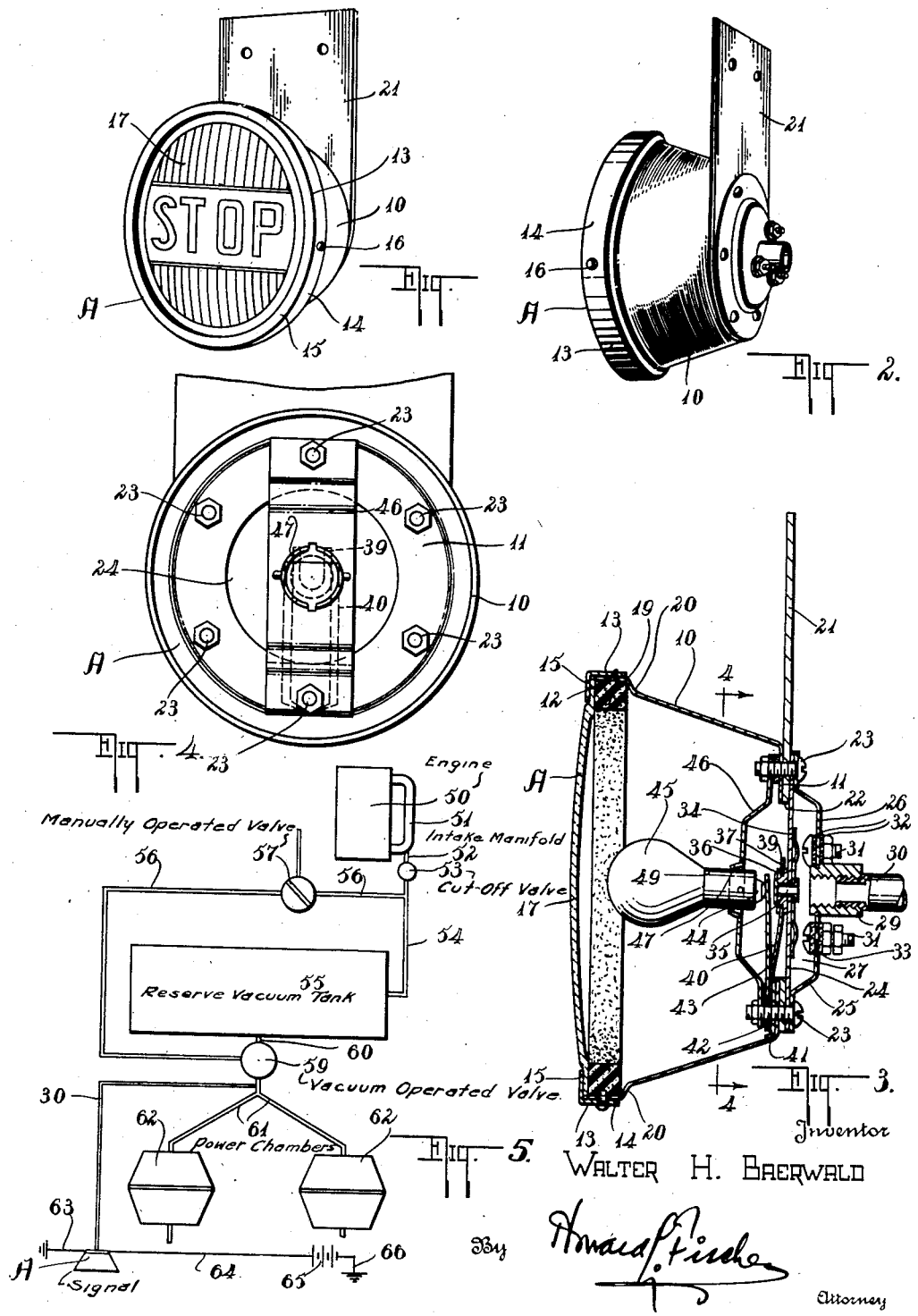
Inventor
WALTER H. BAERWALD
By Howard P. Fischer
Attorney Patented Feb. 23, 1943

2,312,300

UNITED STATES PATENT OFFICE 2,312,300

STOP LIGHT FOR VEHICLES AND TRAILERS

Walter H. Baerwald, Grand Rapids, Minn., assignor of fifty-one per cent to Colleen M. Baerwald, Grand Rapids, Mich.

Application September 20, 1940, Serial No. 357,507

4 Claims. (Cl. 177—339)

My invention relates to an improvement in stop lights for vehicles and trailers wherein it is desired to provide a stop light operable by vacuum introduced into the light through operation of the brake system of the vehicle.

In recent years it has become common practice to provide stop lights on motor vehicles and trailers to provide a visible signal when the brake is applied. In most parts of the country this construction has become compulsory and it is necessary to provide some means of illuminating the stop signal when the brake is used to slow or stop the vehicle. In motor vehicles the switch controlling the stop light is ordinarily provided on the brake operating lever so as to work in conjunction therewith. With trailers, however, difficulty is encountered in connecting the stop light to operate in conjunction with the brake as an additional electrical circuit between the vehicle and the trailer is necessitated by such construction.

It is the object of the present invention to provide a stop light which embodies a switch actuated by vacuum and connected to the vacuum brake system. Thus when vacuum is applied to the brakes the stop light will be actuated to provide a visible signal that the brake is being used. This type of light requires no special electrical circuit and may be connected to the same wiring system used for the remaining signal lights on the trailer if it is so desired.

It is an object of the present invention to provide a vacuum operated switch which will operate before the brake is actually applied and which will remain lit for a short period of time after the brake has been released. This I accomplish by providing a vacuum operated light which takes but a slight amount of vacuum for operation. This slight vacuum will not be sufficient to apply the brakes of the vehicle but will be sufficient to cause a signal in advance of the actual brake operation. Similarly, the ease with which the switch operates causes the switch to remain closed substantially after the brake has been removed. Thus the warning signal is maintained through a longer period of time than the actual brake operation, thus providing additional protection to vehicles travelling in the rear of the trailer or vehicle bearing my stop light.

With this arrangement it is possible for the driver of a vehicle to apply a warning signal for a considerable length of time if desired, before the brake is actually applied. If in travelling over a highway, the driver of the vehicle bearing my stop light notices a vehicle approaching in the rear and apparently proposing to pass the vehicle bearing my stop light, it is possible for the driver to use the stop signal as a means of warning the person to the rear of impending danger. Furthermore, through the use of the stop signal, a driver may warn a following vehicle travelling too close to the rear of danger ahead in the highway.

It is a feature of my invention that the switch is entirely sealed within a casing and that the actual contact is made within a vacuum chamber, thus avoiding danger of starting a fire or explosion through operation of the switch. In instances where gasolene, explosives or other similar material is being carried by the trailer or vehicle, it is difficult to provide a stop light which will cause no danger of a fire or an explosion. My construction will prevent any danger due to causes of this type and accordingly this construction is preferable to the usual stop light construction for use on vehicles of this sort.

Further features of my invention reside in the control of the stop light in conjunction with the vacuum brakes of the vehicle so that but a single lever is required to both apply the brakes of the trailer and to operate the stop light. The light is so designed as to be readily mounted in any desired location upon a vehicle or trailer and is extremely simple to apply.

These and other objects and novel features of my invention will be more clearly and fully set forth in the following specification and claims.

In the drawing forming a part of my specification:

Figure 1 is a perspective front view of my stop light in readiness for operation.

Figure 2 is a rear perspective view of the stop light illustrated in Figure 1.

Figure 3 is a vertical section through the stop light, disclosing the arrangement of the switch elements.

Figure 4 is a cross-sectional view through the stop light housing, the position of the section being indicated by the line 4—4 of Figure 3.

Figure 5 is a diagrammatic plan of the arrangement of the brake system and the manner in which the stop light is attached thereto.

The stop light A comprises a frustro-conical hollow casing 10 having an inturned flange 11 at the smaller diameter end thereof, and having a cylindrical flange 12 at the larger diameter end thereof. A rim 13 comprising a cylindrical ring 14 and an inturned marginal flange 15 is secured encircling the cylindrical flange 12 by any means such as the set screws 16. The rim 13 supports a convex lens 17 within the rim 13 and this lens 17 engages a gasket 19 of sponge rubber or the like, which provides a seal between the lens 17 and the casing 10. A shoulder 20 is provided between the frustro-conical wall of the casing 10 and the cylindrical flange 12 thereof against which the gasket 19 may seat.

A flat supporting bracket plate 21 is provided with a circular opening 22 therethrough and is secured to the inturned flange 11 of the casing 12 by bolts 23. A flexible diaphragm 24 is supported in position to close the opening 22 and is held in place by the same bolts 23 which connect the housing and the bracket plate 21. Also supported in place by the bolts 23 I provide a rear cover plate 25 which is hollowed out to provide a rear wall 26 spaced rearwardly from the diaphragm 24 and to enclose the rear surface of the diaphragm. The space 27 within the rear closure 25 and between this closure and the diaphragm 24 forms a vacuum chamber.

A collar 29 is secured at one end to the rear closure plate 25 and is internally threaded to accommodate a tube or pipe 30 connected into the vacuum line in a manner which will be later described. The passage through the tube 30 continues through the collar 29 and remains in communication with the space 27 within the rear cover plate 24 and when air is withdrawn from the space 27 through the vacuum line 30 the diaphragm 24 is drawn toward the rear cover plate 25.

Extending through the rear cover plate 25 in angularly spaced relation, I provide a series of bolts 31 which are insulated with respect to the rear cover plate by insulating washers 32 which extend between the heads of the bolts 31 and the cover plate and by insulating sleeves 33 which encircle the bolts 31 at the point of passage of these bolts through the rear cover plate 25. One of these bolts 31 provides a terminal through which one wire of an electrical circuit extends.

A disc 34 of electrically conductive material is secured to the diaphragm 24 by means of a rivet 35 or by other suitable means and this rivet also extends through a sleeve 36 containing a groove 37. The groove 37 is designed to constantly engage the bifurcated end 39 of a spring arm 40 which is secured in place by one of the bolts 23 but which is insulated with respect to the bolt 23 and with respect to the casing 10. An insulating sheet 41 extends between the spring arm 40 and the flange 11 of the casing 10 and an insulating sleeve 42 encircles the bolt 23 to space this bolt from the spring arm 40 and the second spring arm 43 electrically connected to the spring arm 40. The spring arm 43 forms a contact with the center terminal 44 of the light bulb 45.

In order to support the light bulb 45 in its proper position I provide a bridge strip 46 which is secured between a pair of opposed bolts 23 and which is electrically connected by these bolts to the casing 10 and the bracket 21. The bridge strip 46 is provided with a central socket 47 to accommodate the shank of the bulb 45 and to electrically engage the sleeve 49 forming one contact of the bulb 45. Thus the sleeve 49 is grounded to the casing 10 and the metallic bracket 21 secured thereto while the center contact 44 of the bulb 45 is electrically connected through the spring arms 43 and 40 to the sleeve 36 which is electrically connected by the rivet 35 to the disc 34. The disc 34 is normally spaced from the heads of the bolts 31 but when vacuum is applied so as to tend to remove air from the space 27, the diaphragm 24 is moved toward the bolts 31 and the disc 34 electrically engages the heads of the bolts 31, one of which forms a terminal for the other or live wire of the lighting circuit.

The manner in which the light is connected is perhaps best illustrated in Figure 5 of the drawing. This figure illustrates diagrammatically a portion of an engine 50 having an intake manifold 51 connected to the vacuum line 52 through a cut-off valve 53. A vacuum line 54 connects the cut-off valve with a reserve vacuum tank 55 while another vacuum line 56 extends through a manually operable valve 57 and is connected to the main vacuum line valve 59 which is connected by a tube 60 to the reserve vacuum tank 55. By manipulation of the manually operable valve 57, vacuum may be applied to operate the vacuum operated valve 59 so as to connect the reserve vacuum tank through the connectors 61 to the power chambers or boosters 62 which operate the vehicle brakes in a manner well known in the art.

Connected into the vacuum line 61 I provide an additional vacuum line 30 which is connected to the collar 29 and to the vacuum chamber 27 in the manner which has previously been described. Thus when the manually operable valve 57 is actuated the vacuum is applied through the vacuum line 39 to cause illumination of the light bulb 45.

As illustrated in Figure 5 of the drawing, the bracket 21 or the casing of the signal A is connected to the ground by the conductor 63 which may be in the form of bolts which connect the bracket 21 to the frame of the trailer or vehicle. One or more of the terminal bolts 31 are connected by the conductor 64 to the battery 65 or other source of electrical current. The opposite terminal of the battery 65 is grounded at 66 so as to complete the circuit when the disc 34 is in contact with the heads of the bolts 31.

The diaphragm 24 is of proper weight to permit easy operation thereof. Thus when even a small amount of vacuum is applied through the connector 30, the light will be illuminated. This amount of vacuum is preferably not sufficient to operate the vacuum chambers or boosters 62 to apply the vehicle brakes. Thus if the manually controlled valve 57 is open just sufficiently to permit a small amount of vacuum to be applied in the line 61, the light will be illuminated while the brakes are not yet in operation. Thus a vehicle signal is provided in advance to the application of the brakes and this signal is maintained until all of the vacuum is released from the system so that the brakes are released substantially before the light is extinguished.

In accordance with the patent statutes I have described the principles of construction and operation of my stop light for vehicles and trailers and while I have endeavored to set forth the best embodiments thereof, I desire to have it understood that these are only illustrative of a means of carrying out my invention and that obvious changes may be made within the scope of the following claims without departing from the spirit of my invention.

I claim:

1. A stop light comprising a casing of electrically conductive material, a light bulb in said casing having one terminal thereof electrically connected to said casing, a vacuum chamber formed at one end of said casing, a diaphragm forming a part of said vacuum chamber, a contact mounted on said diaphragm electrically connected with the other terminal of said light bulb, and electrical conductive means insulated from said casing and extending from said vacuum chamber, which when in contact with said contact on said diaphragm, may operate to close a circuit to said light bulb.

2. A stop light comprising a casing, a vacuum chamber formed at one end of said casing, a diaphragm forming a wall of said vacuum chamber, a contact on said diaphragm, a co-operating contact extending through said casing into said vacuum chamber co-operable with said contact on said diaphragm, and an electrical circuit including a stop light bulb extending through said contact on said diaphragm and through said co-operating contact extending through said casing wall.

3. A stop light comprising a casing, a vacuum compartment adjacent one end of said casing, a lens closing the opposite end of said casing, a diaphragm closing said vacuum compartment, an electrical contact on said diaphragm, a co-operable fixed contact on said vacuum compartment, said contact on said diaphragm and said co-operable fixed contact being normally spaced but operable upon movement of said diaphragm into engagement, and a circuit through said contact on said diaphragm and said co-operable contact including a stop light bulb, said light bulb being illuminated when said contact on said diaphragm and said cooperable contact engage to complete the circuit.

4. A stop light comprising a casing open at opposite ends, a lens closing one of said open ends, a diaphragm closing the other of said open ends, a vacuum chamber adjacent the out side of said diaphragm, a light bulb secured within said casing on the other side of said diaphragm, contact means on said diaphragm electrically connected to one terminal of said light bulb, means connecting said casing to the other terminal of said light bulb, and co-operable contact means within said vacuum chamber normally spaced from said diaphragm but engageable therewith when vacuum is introduced into said chamber.

WALTER H. BAERWALD.